(12) United States Patent
Schröder

(10) Patent No.: US 8,290,633 B2
(45) Date of Patent: Oct. 16, 2012

(54) METHOD FOR OPERATING A FLUIDIC PIPELINE SYSTEM

(75) Inventor: Dierk Schröder, Selent (DE)

(73) Assignee: Siemens Aktiengesellschaft, München (DE)

( * ) Notice: Subject to any disclaimer, the term of this patent is extended or adjusted under 35 U.S.C. 154(b) by 210 days.

(21) Appl. No.: 12/745,972

(22) PCT Filed: Nov. 27, 2008

(86) PCT No.: PCT/EP2008/066303
§ 371 (c)(1),
(2), (4) Date: Jun. 3, 2010

(87) PCT Pub. No.: WO2009/071484
PCT Pub. Date: Jun. 11, 2009

(65) Prior Publication Data
US 2010/0269910 A1 Oct. 28, 2010

(30) Foreign Application Priority Data

Dec. 4, 2007 (DE) .......................... 10 2007 058 211

(51) Int. Cl.
*G06F 19/00* (2011.01)
(52) U.S. Cl. ....................... 700/282; 700/289; 73/861.52
(58) Field of Classification Search .................. 700/240, 700/241, 281–282, 289; 73/861.52
See application file for complete search history.

(56) References Cited

U.S. PATENT DOCUMENTS

| | | | |
|---|---|---|---|
| 2,638,912 A | | 5/1953 | Lee, II |
| 5,244,004 A | * | 9/1993 | Robertson ....................... 137/14 |
| 5,938,246 A | * | 8/1999 | Wallace et al. ................ 285/351 |
| 6,041,856 A | * | 3/2000 | Thrasher et al. ................. 166/53 |
| 6,068,016 A | * | 5/2000 | Manofsky et al. ............. 137/269 |
| 6,568,416 B2 | * | 5/2003 | Tucker et al. ..................... 137/14 |
| 6,701,223 B1 | * | 3/2004 | Rachford et al. ............. 700/301 |
| 7,121,813 B2 | * | 10/2006 | Choi et al. ..................... 417/279 |
| 7,647,136 B2 | * | 1/2010 | McDowell ..................... 700/282 |
| 2007/0084940 A1 | | 4/2007 | Vafai et al. |
| 2007/0203623 A1 | | 8/2007 | Saunders et al. |

FOREIGN PATENT DOCUMENTS

| | | |
|---|---|---|
| DE | 3787266 T2 | 3/1994 |
| DE | 19912588 A1 | 9/2000 |
| EP | 0819895 A2 | 1/1998 |
| EP | 1286240 A1 | 2/2003 |
| RU | 2099770 C1 | 12/1997 |
| RU | 2183849 C2 | 6/2002 |
| WO | WO 03001312 A1 | 1/2003 |

* cited by examiner

*Primary Examiner* — Kidest Bahta

(57) ABSTRACT

A method for operating a fluidic pipeline system including an active component generating a volume flow of a medium in the system is provided. A plurality of flow channels are connected in parallel with each other and supplied jointly with the volume flow of the medium by the active component. Each flow channel has an individual volume flow requirement of the medium, the requirement is variable over time for at least part of the flow channels. The volume flow in each flow channel includes a time-variable volume flow requirement individually throttled as a function of a control variable associated with the flow channel. The volume flow generated by the active component is additionally regulated as a whole so that no individual throttling of the local volume flow is required in at least one of the flow channels.

7 Claims, 2 Drawing Sheets

METHOD FOR OPERATING A FLUIDIC PIPELINE SYSTEM

CROSS REFERENCE TO RELATED APPLICATIONS

This application is the US National Stage of International Application No. PCT/EP2008/066303, filed Nov. 27, 2008 and claims the benefit thereof. The International Application claims the benefits of German application No. 10 2007 058 211.2 DE filed Dec. 4, 2007. All of the applications are incorporated by reference herein in their entirety.

FIELD OF INVENTION

The invention relates to a fluidic pipeline system, specifically a method for operating a fluidic pipeline system.

BACKGROUND OF THE INVENTION

In larger-scale fluidic pipeline systems, in particular piping systems on board ships, a plurality of consumers or "loads" are typically supplied with different media. A load can be, for example, a heat exchanger, a hydraulic drive or a system having a requirement to be supplied continuously with lubricant, e.g. in a drive. From the hydrodynamic point of view, a load within the meaning of the present invention is a flow channel having an individual, possibly variable flow resistance in each case and an individual volume flow requirement of a medium. Furthermore the pipe run via which a load is connected to the overall system has a pipe resistance resulting from the given physical conditions and the transported volume flow. In designing a system of this kind the object is to satisfy the different requirements of the individual loads by means of suitable measures, e.g. diaphragms in the pipe runs, in such a way that each load receives the volume flow it requires at any given time. The active component of the system (e.g. pump, compressor) is in this case operated at a fixed, non-variable speed. As regards the static performance of such a system, this object can be achieved sufficiently well at the present time.

As far as the dynamic characteristics of such a system are concerned, the following approach is currently adopted in shipbuilding generally: A load is provided with a bypass and a control or regulating element (e.g. a three-way valve). By means of a diaphragm if necessary the bypass acquires a hydrodynamic resistance which is as similar as possible to that of the load over a wide range of different volume flows. According to the requirement of the load, the control or regulating element controls a variable proportion of the volume flow, from 0% up to 100% if necessary, via the bypass. Because of the almost identical hydrodynamic resistance in the load and in the bypass the overall system and hence the further loads connected in parallel or in series are not affected by the regulating operation and so remain quasi-static. This facilitates the regulating and control function and limits the overhead.

SUMMARY OF INVENTION

Proceeding on the basis of this prior art, the object of the invention is to minimize the energy consumption of a fluidic pipeline system of the type described hereintofore.

This object is achieved according to the invention by means of a method as claimed in the claims. Advantageous embodiments are set forth in the dependent claims.

The invention is based on the knowledge that the conventional controlled reduction of the volume flow of individual loads via a respective bypass results in power losses, some of which are unnecessary. These losses can be minimized if the volume flow in the overall system is minimized instead of media being driven through the system in unnecessarily large quantities.

It is provided according to the invention to reduce the delivery capacity of the active component, taking into account the volume flows required by the individual loads, to such an extent that in the case of at least one load an individual restriction or throttling of the volume flow is no longer necessary. The volume flows of the remaining loads are individually throttled to the extent necessary in each case. In this way the sum total of the volume flows of all of the loads is minimized.

This minimizes the overall resistance of the system, since, as is well known, the pipe resistance in a given system increases with the square of the volume flow which is transported through the given pipe cross-section. As the delivery capacity of the active component of the system (e.g. pump, compressor) corresponds to the product of volume flow and pressure difference to be applied, the delivery capacity and consequently also the drive power required by the active component are minimized.

Although this can result in the active component being operated at a level of efficiency which possibly also deviates significantly from the possible optimal value, depending on the design of the overall system and the distribution of the possible operating points, this is not critical. Rather, it is primarily a question of what capacity absolutely requires to be supplied in order to fulfill the system function. This is lower in the case of the invention than in the case of the conventional mode of operation described previously.

If the overall volume flow of the system is reduced as a result of the regulation of the active component, an additional reduction in the overall power loss is obtained owing to the fact that the overall resistance in a pipeline system decreases with the square of the reducing volume flow in the given pipes. Herein resides a further advantage of the invention.

Since it is not necessary in the case of the system embodiment according to the present invention to ensure an approximately constant flow resistance of each individual load in relation to the rest of the system, installing bypasses around the loads is not required. This simplifies the technical layout of the system.

BRIEF DESCRIPTION OF THE DRAWINGS

An exemplary embodiment of the invention is described below with reference to the drawings, in which.

DETAILED DESCRIPTION OF INVENTION

Figure 1:
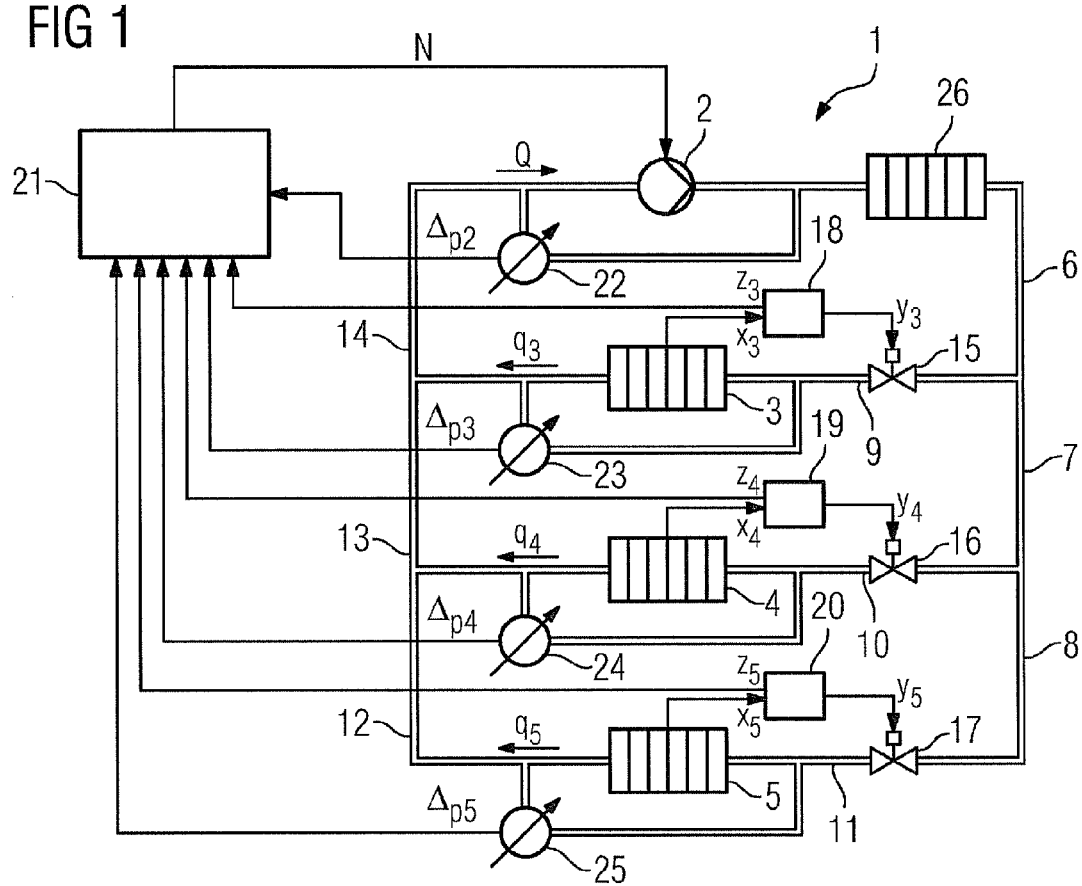
FIG. 1 shows the basic layout of a fluidic pipeline system according to the invention.

FIG. 1 provides a schematic overview of the layout of a fluidic pipeline system 1 according to the invention. Said system 1 comprises by way of example an active component in the form of a pump 2, a plurality of flow channels of specific function connected in parallel with one another, referred to here as loads 3 to 5, and a plurality of pipelines 6 to 14 which connect the individual loads 3 to 5 to the pump 2. Typically, a real system has a plurality of pumps e.g. in a pump station, though in the following reference is made to just one pump for the sake of simplicity.

The loads 3 to 5 can be coolers, for example. The illustrated number of three loads is meant purely by way of example and has no upper limit. The pipelines 9, 10 and 11 in each case comprise the entire part of the pipeline system assigned to the respective load 3, 4 or 5 alone and not just the section directly identified by the respective reference signs 9, 10 and 11.

Connected into each pipeline 9 to 11 upstream or downstream of each load 3 to 5 in the circuit is a throttle valve 15 to 17, respectively, which is controlled by a respective controller 18 to 20. The controllers 18 to 20 record respective control variables $x_3$ to $x_5$ at the loads 3 to 5 and based thereon output actuating signals $y_3$ to $y_5$ to the throttle valves 15 to 17. In this case the type of the control variables $x_3$ to $x_5$ is dependent on the function of the loads 3 to 5. If, for example, the loads are coolers, the control variables $x_3$ to $x_5$ are temperatures. At the same time the controllers 18 to 20 also output feedback signals $z_3$ to $z_5$ to a central controller 21, in which feedback signals are included the settings of the throttle valves 15 to 17 and of the control variables $x_3$ to $x_5$.

The pump 2 is equipped with a controllable drive. In the case of an electric motor this means the control function is effected by means of a frequency converter having a variable rather than a fixed frequency. By this means the speed of the pump 2 can be varied and hence the volume flow of the overall system 1 can also be varied by the pump 2. The drive of the pump 2 is controlled by the central controller 21 which for that purpose outputs an actuating signal N for the speed of the pump 2.

In addition both the pump 2 and the loads 3 to 5 are in each case equipped with a measuring device 22 and 23 to 25, respectively, which measure the respective pressure differences across the pump and across the individual loads 3 to 5 and issue corresponding measurement signals $\Delta p_2$ and $\Delta p_3$ to $\Delta p_5$, respectively, to the central controller 21.

In a pipeline 6 through which the overall volume flow Q flows, the pipeline system 1 additionally contains a compensation element 26 which compensates for the effect of the loads 3 to 5 in respect of the transport of energy and/or materials. If, for example, the loads 3 to 5 are heat exchangers by means of which the medium flowing in the pipeline system 1 absorbs heat capacity, then the compensation element 26 represents a heat exchanger by means of which the medium flowing in the pipeline system 1 dissipates heat capacity to the environment so that the temperature of the medium always remains within a predetermined range. If part of the medium flowing in the pipeline system 1 is materially consumed in the loads 3 to 5, then the compensation element is a reservoir from which a corresponding amount of the medium is supplied in order to keep the amount of medium present in the pipeline system 1 approximately constant at all times.

Figure 2:
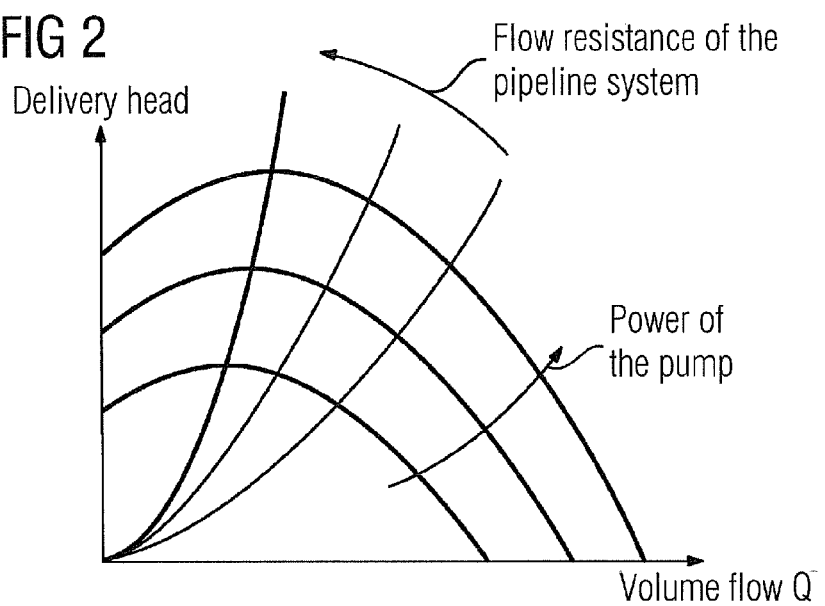
FIG. 2 shows the basic shape of the characteristic curves of the active component and the passive part of a fluidic pipeline system.

In order to aid an understanding of the principle of operation of the method according to the invention, the characteristic curves of a fluidic pipeline system 1 of the type considered here will now be examined briefly with reference to FIG. 2. FIG. 2 shows the pressure, also referred to as the delivery height or head H, over the overall volume flow Q of the system 1, with in each case one family of characteristics (the throttle curves of the pump) being shown for the behavior of the pump 2 and one family of characteristics (the system characteristic curves) being shown for the behavior of the pipeline system 3 to 17. The illustration of FIG. 2 has purely qualitative character.

The three characteristic curves (throttle curves) initially rising slightly from left to right and then dropping down to zero are pump characteristic curves for different speeds, i.e. different drive capacities of a pump 2, wherein, as the speed increases, the pump characteristic curves are shifted toward a greater delivery head (with the square of the speed change $H_1/H=(n_1/n)^2$) and volume flow (with the speed change $Q_1/Q=n_1/n$). The power draw of the pump increases (without consideration of bearing and seal losses) with the cube of the speed change ($P_1/P=(n_1/n)^3$).

The three characteristic curves (system characteristic curves) starting at zero on the left and progressively rising are characteristic curves of a pipeline system 3 to 17 connected to the pump 2 for different states of said system, i.e. for different settings of the throttle valves 15 to 17. The greater the throttling effect, in other words the overall flow resistance of the pipeline system 3 to 17, the more delivery head H is required in order to achieve a specific volume flow Q and consequently the more drive capacity needs to be applied at the pump 2.

Since the overall volume flow Q flows through both the pump 2 and the pipeline system 3 to 17, the operating point of the overall system 1 is yielded as the point of intersection of the respectively valid characteristic curve of the pump 2 with the respectively valid characteristic curve of the overall pipeline system 3 to 17 and, given sufficient knowledge of all the system parameters, can be calculated numerically. The conventional approach is to operate both at a constant pump capacity and at as constant a flow resistance as possible, in other words in a single, maximally constant operating point of the overall system 1.

Accordingly the present invention pursues the objective of always selecting an operating point of the overall system 1 having a minimum possible flow resistance of the pipeline system 3 to 17 so that a volume flow Q of given size required overall by the loads 3, 4 and 5 is achieved with a minimum possible pump capacity. Toward that end, given a time variability of the required volume flow Q of individual loads, a time variability both of the flow resistance and of the pump capacity is allowed, with the result that the respectively valid characteristic curves of the pump 2 and of the pipeline system 3 to 17 constantly change and consequently the operating point resulting as the point of intersection of the two characteristic curves constantly shifts.

At the time of startup of the fluidic pipeline system 1 according to FIG. 1, certain data are known:
family of characteristics of the pump according to FIG. 2
power draw of the pump at specific points of the family of characteristics
flow resistance of the throttle valves 15 to 17
number and type of the loads 3 to 5
configuration of the pipeline network 3 to 17

Figure 3:
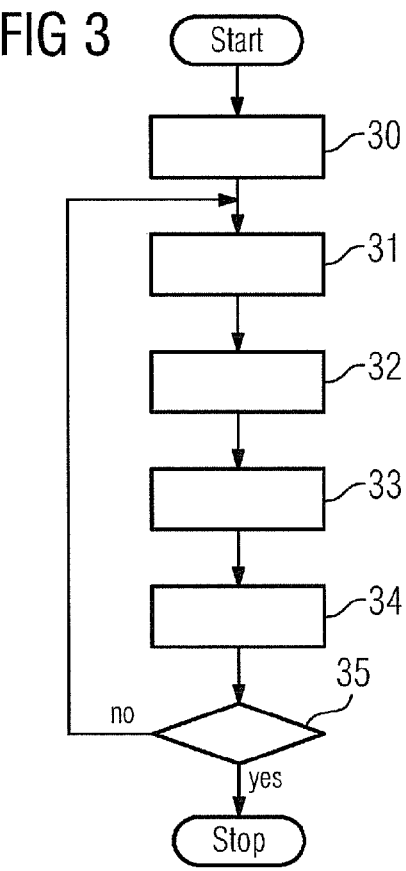
FIG. 3 shows the sequence of the inventive system initialization as a flowchart.

Knowledge of the volume flows $q_3$ to $q_5$ through the individual loads is required in order to control the system 1 in accordance with the inventive method. In order to enable said volume flows $q_3$ to $q_5$ to be measured across the pressure differences $\Delta p_3$ to $\Delta p_5$, an initialization method, automated where appropriate, is performed prior to the startup of the system 1, said initialization method being explained below with reference to the flowchart of FIG. 3.

First, at step 30, the throttle valves 15 to 17 of all the loads 3 to 5 are fully opened. The pump 2 is then brought to its nominal capacity and the pressure difference $\Delta p_2$ across the pump 2 is measured. Based on the known family of characteristics of the pump 2, the result obtained herefrom is the minimum flow resistance of the overall pipeline system 3 to 17.

Next, at step 31, a new, i.e. so far not yet processed, load n is selected and the throttle valve assigned to said load is fully opened. In the first execution of step 31 after step 30 said valve is already open, though in later executions of step 31 it is no longer open.

Then, at step 32, the throttle valves of all the other loads are fully closed. If, for example, the load 3 is selected and its throttle valve 15 opened at step 31, then at step 32 the throttle valves 16 and 17 of the two other loads 4 and 5 are closed. What is achieved in this way is that the overall volume flow Q of the system 1 is identical to the individual volume flow $q_n$ of the load n selected in each case.

At step 33, the throttle valve of the selected load n is now driven into different settings, in other words the actuating signal $y_n$ is varied, and in each setting the pressure difference $\Delta p_n$ is measured across the selected load and the pressure difference $\Delta p_2$ is measured across the pump 2. In this way a characteristic curve of $\Delta p_2$ is determined as a function of $\Delta p_n$. In this case the number of measuring points should be specified according to the desired regulating or control precision, since in the subsequent further use of the recorded characteristic curve it will be necessary to interpolate between the measuring points.

Because a volume flow Q through the pump 2 is uniquely assigned via the known family of characteristics of the pump 2 at a given drive capacity to each value of the pressure difference $\Delta p_2$, the characteristic curve determined at step 33 can be readily converted at step 34 into a characteristic curve of the overall volume flow Q as a function of the pressure difference $\Delta p_n$ across the selected load n. Owing to the enforced identity of the overall volume flow Q with the individual volume flow $q_n$ of the selected load n, said characteristic curve obtained at step 34 is at the same time the characteristic curve of the individual volume flow qn of the selected load n as a function of the pressure difference $\Delta p_n$.

At step 35 a check is made to determine whether all of the loads have been measured in the above-described way or not. If not, a return branch is made to step 31 and a new, so far not yet measured load is selected there. If the outcome of the check is yes, the initialization method is terminated.

Figure 4:
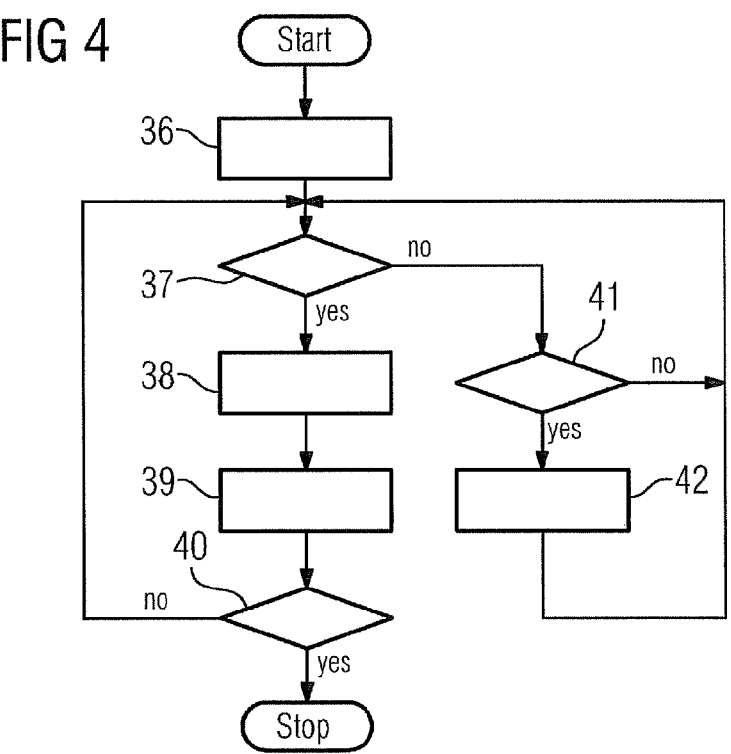
FIG. 4 shows the sequence of the inventive control of the active component of a fluidic pipeline system as a flowchart.

The described initialization method permits the individual volume flows of the loads 3 to 5 to be recorded across the respective pressure differences $\Delta p_3$ to $\Delta p_5$ during the subsequent routine operation of the system 1 and in this way the volume flow Q requiring to be provided overall by the pump to be determined. The routine operation of the system 1 according to the invention is explained below with reference to the flowchart of FIG. 4.

First, at step 36, the pump 2 is set to its nominal capacity and the control loops of all loads 3 to 5 are activated. The controllers 18 to 20 thereupon set the throttle valves 15 to 17 by means of the actuating signals $y_3$ to $y_5$ such that the control variable $x_3$ to $x_5$ recorded at each load 3 to 5 approaches a respective setpoint value.

At step 37 a check is then made to determine whether any throttle valve 15 to 17 is still not completely open. The central controller 21 receives this information from the controllers 18 to 20 via the feedback signals $z_3$ to $z_5$. If this applies, the pump capacity is higher overall than would be necessary to supply all the loads 3 to 5 with adequate volume flows $q_3$ to $q_5$.

In this case, as the next step (step 38) the overall volume flow Q and the volume flows of the individual loads 3 to 5 are recorded across the pressure differences $\Delta p_2$ to $\Delta p_5$. From the characteristic curves (pressure difference as a function of the volume flow) of the individual loads and the overall flow resistance, which were determined in the previously described initialization phase, it is then calculated, at step 39, how far the capacity of the pump can be reduced until it is no longer necessary in the case of one of the loads 3 to 5 to throttle the volume flow through the associated throttle valve 15 to 17. This minimum capacity is specified to the pump 2 by the central controller 21 via the speed N.

At step 40 a check is made to determine whether the routine operation of the system is to be continued or not. If yes, a branch is made back to step 37. Otherwise routine operation terminates. How the system 1 is powered down in this event and reliably brought to the quiescent state is of no relevance here.

If the result of the check performed at step 37 is that in the case of one of the loads 3 to 5 the associated throttle valve 15 to 17 is already completely open, a check is made at step 41 to determine whether said load does not require a greater volume flow than it can receive in the current state of the system 1. The central controller 21 receives this information via one of the feedback signals $z_3$ to $z_5$ from that one of the controllers 18 to 20 which has already completely opened the throttle valve controlled by it. In the case of an already completely open throttle valve the controller in question determines this from the control difference between the setpoint value and the actual value of the respective control variable.

If the load having a completely open throttle valve requires a greater volume flow than is currently available, then at step 42 the pump capacity is increased by a defined amount, wherein the extent of said increase can be dependent on the size of said control difference. Otherwise step 42 is not executed. Next, whatever the case, a return branch is made to step 37. The result of this is that the loop leading via steps 37, 41 and 42 is iteratively repeated, and consequently the pump capacity increased, until the load in question receives an at least adequate volume flow.

In principle it is also possible that over the course of time the associated throttle valve 15 to 17 will be completely opened in the case of more than one of the loads 3 to 5. In this event the check carried out at step 41 will be performed for all of the loads finding themselves in this state.

It is evident that as a result of the above-described method, with the exception of an initial settling phase, any one of the loads 3 to 5 is operated almost constantly with a completely open throttle valve 15 to 17 during routine operation and that consequently the pump 2 is operated at a capacity which, averaged over time, lies significantly below the nominal capacity if it is assumed that the nominal capacity is dimensioned such that it can fulfill the highest possible volume flow requirement of the system 1.

It is to be understood that the controllers 18 to 20 assigned to the individual loads 3 to 5 can also be combined structurally with the central controller 21. All that is essential is that a primary control loop is provided for the pump 2 and a plurality of secondary control loops are provided for the individual throttle valves 15 to 17.

Determining the system parameters at the startup time of a thus equipped system can be automated. Any time-consuming and costly adjustment of diaphragms that may be required, as is often necessary in the case of conventional systems, can be dispensed with.

Insofar as reference is made here to pipes or, as the case may be, to a pipeline system, it is to be understood that all that has been stated hereintofore applies equally to pipelines, flexible hose lines, flow channels with square-cut cross-sectional shape, as well as to pipeline systems which include sections consisting of a plurality of different types of closed, flow-conducting conduits. All such variants of pipeline systems shall be encompassed within the scope of protection conferred by the claims.

The invention claimed is:

1. A method for operating a fluidic pipeline system, comprising:
generating a volume flow of a medium in the fluidic pipeline system by an active component; and
supplying a plurality of flow channels connected in parallel with one another with the volume flow of the medium by the active component,
wherein each flow channel includes an individual volume flow requirement of the medium, the individual volume flow requirement is variable over time for at least a part of the plurality of flow channels,
wherein for each flow channel that includes a time-variable volume flow requirement, a respective local volume flow is individually throttled as a function of a control variable assigned to the flow channel, and
wherein that in addition an overall volume flow generated by the active component is controlled in such a way that no individual throttling of the respective local volume flow is required in at least one of the plurality of flow channels.

2. The method as claimed in claim 1, wherein prior to a startup of the fluidic pipeline system, a correlation between a respective pressure difference dropping across the flow channel and the respective local volume flow flowing through the flow channel is determined for each individual flow channel.

3. The method as claimed in claim 2,
wherein prior to the startup of the fluidic pipeline system, in order to determine the correlation during nominal operation of the active component, the plurality of flow channels with the exception of the flow channel for which the correlation is to be determined are closed,
wherein a plurality of characteristics of the active component are known,
wherein an extent of the throttling at the single unclosed flow channel is varied and in the process the respective pressure difference dropping across the flow channel and the pressure difference dropping across the active component are measured, and
wherein on the basis of the known plurality of characteristics, the respective local volume flow is assigned to each value of the respective pressure difference measured across the unclosed flow channel.

4. The method as claimed in claim 1,
wherein prior to the startup of the system during nominal operation of the active component and in an unthrottled state of each of the plurality of flow channels the pressure difference is measured across the active component, and
wherein on the basis of the known plurality of characteristics of the active component a minimum overall flow resistance of the fluidic pipeline system connected to the active component is determined.

5. The method as claimed in claim 1, wherein the overall volume flow that is to be set by a controller during normal operation of the fluidic pipeline system is determined on the basis of the plurality of correlations applying to the plurality of individual flow channels between the plurality of respective pressure differences and the plurality of respective volume flows, and on the basis of the minimum overall flow resistance of the pipeline system connected to the active component.

6. The method as claimed in claim 1,
wherein during normal operation of the fluidic pipeline system the volume flow requirement of a flow channel which is operated unthrottled is monitored continuously, and
wherein if there is an increase in the volume flow requirement the overall volume flow generated by the active component will be increased.

7. The method as claimed in claim 1, wherein the overall volume flow generated by the active component is set via a drive capacity of the active component.

* * * * *